United States Patent [19]

Yang et al.

[11] 4,059,675

[45] Nov. 22, 1977

[54] DECOMPOSITION OF HALOGENATED ORGANIC COMPOUNDS

[75] Inventors: Kang Yang; James D. Reedy; John F. Scamehorn, all of Ponca City, Okla.

[73] Assignee: Continental Oil Company, Ponca City, Okla.

[21] Appl. No.: 696,167

[22] Filed: June 14, 1976

Related U.S. Application Data

[63] Continuation-in-part of Ser. No. 689,221, May 26, 1976, abandoned, which is a continuation-in-part of Ser. No. 613,159, Sept. 15, 1975, abandoned.

[51] Int. Cl.$^2$ .............................................. B01D 53/34
[52] U.S. Cl. .................................... 423/240; 423/245; 423/481; 423/502

[58] Field of Search ............... 423/240, 241, 245, 481, 423/502

[56] References Cited

U.S. PATENT DOCUMENTS

| | | | |
|---|---|---|---|
| 3,437,445 | 4/1969 | Hay et al. | 423/502 |
| 3,972,979 | 8/1976 | Kageyama | 423/240 |

*Primary Examiner*—Earl C. Thomas
*Attorney, Agent, or Firm*—Bayless E. Rutherford, Jr.

[57] ABSTRACT

A method for decomposing halogenated organic compounds which comprises: (a) preheating the halogenated organic compound to a temperature above about 300° C. and (b) contacting the preheated organic compound with a catalytic amount of ruthenium in the presence of an oxidizing agent at a temperature of at least about 350° C.

17 Claims, No Drawings

DECOMPOSITION OF HALOGENATED ORGANIC COMPOUNDS

CROSS-REFERENCE TO RELATED APPLICATIONS

The present application is a continuation-in-part of application Ser. No. 689,221 filed May 26, 1976, and now abandoned which in turn, was a continuation-in-part of application Ser. No. 613,159, filed Sept. 15, 1975 and now abandoned.

DISCLOSURE

Field of the Invention

Briefly, the invention is in the field of decomposing halogenated organic compounds. More specifically, the invention is in the field of removal of vinyl halides (e.g. by the decomposition thereof) from gas streams.

Background

Polyvinylchloride, which is prepared by the polymerization of vinyl chloride, is one of the most useful of modern commercial plastics. Unfortunately, it is now believed to be well-established that vinyl chloride in sufficient concentration is harmful. In view of this, extensive research is now being conducted on methods of decomposing, or removing, vinyl chloride. Our invention is directed to a method for decomposing a vinyl halide, such as vinyl chloride. More specifically, our invention is directed to a method of decomposing a vinyl halide, such as vinyl chloride, when present in an oxygen-containing gas stream such as air.

While decomposition of vinyl chloride is an important use for our method it is readily apparent that the method is also useful for decomposing other halogenated organic compounds, as defined hereinafter.

Prior Art

The following prior art is believed to be of possible pertinency:

Ruthenium is known as a catalyst for the destructive oxidation of organic compounds such as sucrose, glycine and eicosane. [1]

The catalytic cleavage of ethyl chloride by platinum metal is described in two references. [2,3]

However, it is generally acknowledged that halogen-containing compounds are poisonous to noble metal oxidation catalysts. [4,5,6]

[1] Dokl. Akad. Nank SSSR 200 (5), 1105-b (1971) C.A. 76:14867 u
[2] Chemiker Ztz 88 (1), 15–16 (1964) C.A. 60:7503b
[3] Z. Electrochem. 58, 762–6, (1954) C.A. 49:6708e
[4] "Industrial Pollution Control Handbook" edited by H. F. Lund, McGraw-Hill, 1971, Chapter 5
[5] ibid (4) — Chapter 7
[6] ibid (4) — Chapter 14

U.S. Pat. No. 3,453,073 teaches that halogen values in chlorinated hydrocarbons are recovered by passing a gaseous mixture of the chlorinated hydrocarbons, water and oxygen through a bed of a catalyst to form hydrogen chloride which is then recovered. While the patent teaches a multitude of catalysts it does not teach ruthenium.

U.S. Pat. No. 3,845,191 teaches a process for the oxidation of halocarbon comprising chlorofluorocarbons which comprises contacting the halocarbon with oxygen and a member selected from the class consisting of oxides of calcium, aluminum, barium, magnesium, iron, nickel and mixtures thereof at from 750° C. to 1100° C. Again, this patent does not teach ruthenium as a catalyst for the decomposition of halogenated organic compounds.

U.S. Pat. No. 3,933,980 teaches a method for reducing the amount of ethylenically unsaturated chlorinated hydrocarbons in gaseous mixtures. Briefly, the method comprises contacting a gas stream containing the ethylenically unsaturated chlorinated hydrocarbons with ozone. The process does not use a catalyst.

British Pat. No. 1,046,313 teaches a process for preparing chlorine, bromine or iodine from the compounds of these halogens with hydrogen. Briefly, the process comprises the oxidation of the hydrogen halide in the gaseous phase using ruthenium compounds as the catalyst. Inasmuch as oxidation of hydrogen halides and organic halides normally use different catalysts they are considered, by people skilled in the art, as being entirely non-analogous reactions.

In summary, the art does not teach, nor recognize the advantages obtained by preheating the feedstock as described by Applicants' invention. Nor does it teach ruthenium as a catalyst for decomposing vinyl halides.

BRIEF SUMMARY OF THE INVENTION

Broadly stated, the present invention is directed to a method for decomposing halogenated organic compounds wherein the method comprises:

a. heating the halogenated organic compound to a temperature above about 300° C., b. contacting the heated organic compound with a catalytic amount of ruthenium in the presence of an oxidizing agent at a temperature of at least about 350° C.

In one aspect, the present invention is directed to a method for decomposing halogenated organic compounds, wherein the method comprises:

a. heating a gaseous stream comprising said halogenated organic compounds and an oxidizing gas to a temperature above about 300° C., b. passing the heated gaseous stream of step (a) through a heated zone wherein it contacts ruthenium catalyst, at a temperature of at least about 350° C.

In a preferred embodiment the halogenated organic compound is vinyl chloride, the oxidizing gas is air or a mixture of nitrogen and oxygen, and the ruthenium catalyst is supported on a non-oxidizable carrier.

DETAILED DESCRIPTION

Materials

Suitable halogenated organic compounds for use in our process are those containing 1 to 4 carbon atoms and containing at least as many hydrogen atoms as halogen atoms. Also suitable are mixtures of halogenated organic compounds containing 1 to 4 carbon atoms wherein the total number of hydrogen atoms in the mixture is at least equal to the total number of halogen atoms. Particularly suitable halogenated organic compounds are unsaturated organic compounds such as the vinyl halides and mixtures of $C_1$ halogenated compounds and $C_2$ halogenated compounds containing vinyl halides, wherein in said mixtures the total number of hydrogen atoms is at least equal to the total number of halogen atoms. The preferred halogenated organic compounds are those wherein the halogen is chlorine. Using chlorine as a typical halogen, examples of suitable halogenated organic compounds are materials represented by the formulae $CH_3Cl$, $CH_2Cl_2$, $CH_3CHCl_2$, $CH_2Cl\ CH_2Cl$, $CH_2 = CHCl$, $CH_3CH = CHCl$, $CH_3CH_2CH = CHCl$.

From the foregoing description it is understood that the halogenated organic compounds contain only carbon, hydrogen and halogen.

The catalyst employed in the method of this invention is ruthenium. The ruthenium may be in the form of finely divided metallic ruthenium or in the form of ruthenium coated or impregnated on a non-oxidizing carrier as a support. Suitable carriers include $Al_2O_3$, $SiO_2$, SiC, $Fe_2O_3$, and kieselguhr including diatomaceous earth or, more generally, any of the non-oxidizing carriers normally employed with noble metal catalysts (e.g. platinum). These catalytic forms of ruthenium are generally commercially available and are well known in the art.

The preferred form of the catalyst is ruthenium impregnated on alumina.

By comparison, it is interesting to note that in our process we have found ruthenium to be about 50 times as effective as platinum when platinum is coated on a carrier support (e.g. alumina coated with platinum) although this same degree of increased effectiveness is not seen with respect to platinum-impregnated catalysts. Also, we have found that palladium, ferric oxide and manganese oxide are not effective in our process.

It is of further interest that use of a platinum catalyst results in conversion of substantially all of the halogen values present to hydrogen halides, whereas the use of ruthenium catalyst results in a product mixture containing a substantial amount of halogen gases in addition to hydrogen halides.

Generally, when ruthenium is employed in a form supported on a carrier the catalyst will contain in the range of 0.01 to 1 percent by weight ruthenium. It is to be understood that this is not a critical feature of our invention since any amount of ruthenium is effective to some extent in our process.

Suitable oxidizing agents include air, oxygen, and mixtures of nitrogen and oxygen.

Process Conditions

An important feature of our process is heating the halogenated organic compound prior to passing it into the reactor zone where it is contacted with the catalyst. The oxidation of the halogenated organic compound in the presence of the catalyst is exothermic but does not proceed spontaneously. In order that the reaction occur when contacted with catalyst it is necessary to have the halogenated organic compound at some minimum elevated temperature before contacting with the catalyst. (Persons skilled in this art often call this step "preheating.") This particular heating step should be conducted using a temperature above about 300° C. more suitably above 320° C., and preferably above 340° C. The maximum temperature for this heating step is about 600° C., preferably about 500° C.

We have found that this preheating improves the life of the catalyst and provides a more efficient decomposition of the halogenated organic compound. Moreover, it has been found that attempts to conduct the process by simply heating the reactants to the necessary temperatures in the reaction zone without preheating results in the catalyst being quickly rendered ineffective due to deposition of carbon and carbon-containing compounds. This is particularly true when vinyl chloride is the halogenated organic compound being decomposed.

The heated halogenated organic compound is then passed to a reaction zone containing the catalyst. Since the reaction is exothermic, the temperature in the reaction zone varies, with the highest temperature suitably being in the range of about 350° to about 600° C., preferably in the range of about 400° to about 500° C. (The highest temperature in the reaction zone is often referred to as "hot spot" temperature.)

Our process is particularly suitable for use with air (or a mixture of nitrogen and oxygen) containing the halogenated organic compound (e.g. vinyl chloride) wherein the halogenated organic compound can be present over a wide range. In order to provide a more specific teaching the GHSV (gas hourly space velocity) of gas including halogenated organic compound to catalyst can be in the range of 100 to 100,000 l/hr.

While it is believed to be implied from the foregoing it may be well to state that our invention is also applicable to processes wherein liquid halogenated organic compounds are vaporized and injected into the oxidizing gas.

Pressure is not critical, it being understood that conducting the process in liquid phase requires that it be under pressure.

A particularly unique feature of our process is that the catalyst has a long life while still providing an effluent containing only a small amount of vinyl chloride. For example in laboratory tests the catalyst has been effective for at least 360 hours of continuous operation.

If desired the effluent gas from our process can be passed through a scrubber to absorb the decomposition products.

In order to illustrate the nature of the present invention still more clearly the following examples will be given. It is to be understood, however, that the invention is not to be limited to the specific conditions or details set forth in these examples except insofar as such limitations are specified in the appended claims.

In the following examples the reactor, which was a 11 cm. length of 1.3 cm. diameter stainless steel tube, was placed in a Lindburg furnace. A preheater, 20 cm. long 1.3 cm. diameter stainless steel tube, preceded the reactor.

The catalyst was a commercial catalyst obtained from Engelhard. It comprised 2 mm. $Al_2O_3$ spheres, as the carrier, containing 0.5% Ru. Five grams of the catalyst was packed in the reactor.

EXAMPLE 1

Air containing 5,500 parts per million (ppm) vinyl chloride was passed through the apparatus with a preheater temperature of 340 and a maximum reactor temperature of 376° C. The rate of air containing vinyl chloride passed through the apparatus was 1,200 cc/min. The concentration of vinyl chloride in the outlet air was 2 ppm. The catalyst activity remained constant during 360 hrs. of continuous operation. Analysis of the effluent gas indicated that the vinyl chloride had been converted to $CO_2$, $H_2O$, HCl and $Cl_2$. 37% of the chlorine in the vinyl chloride was converted to $Cl_2$, with the remainder being converted to HCl.

EXAMPLE 2

Example 1 was repeated except that the maximum reactor temperature was 450° C. Similar results were obtained.

EXAMPLE 3

Example 1 was repeated except that it used a platinum catalyst coated on $Al_2O_3$ spheres containing 0.5% platinum. The effluent air contained about 50 times the amount of vinyl chloride as was obtained in Example 1.

EXAMPLES 4-6

Example 1 was repeated except that the catalyst was the following:

Ex. 4 — Palladium on alumina
Ex. 5 — Ferric Oxide
Ex. 6 13 Manganese Oxide

These catalysts were not effective for reducing the vinyl chloride content.

Thus, having described the invention in detail, it will be understood by those skilled in the art that certain variations and modifications may be made without departing from the spirit and scope of the invention as defined herein and in the appended claims.

We claim:

1. A method for decomposing chlorinated organic compounds, said chlorinated organic compounds containing 1 to 4 carbon atoms and containing at least as many hydrogen atoms as chlorine atoms, said method comprising:
   a. heating the chlorinated organic compounds to a temperature above about 300° C., and
   b. then contacting the heated organic compound with a catalytic amount of ruthenium in the presence of an oxidizing agent at a temperature of at least about 350° C.

2. The process of claim 1 wherein the oxidizing agent is air or a mixture of nitrogen and oxygen.

3. The process of claim 2 wherein the chlorinated organic compounds are selected from the group consisting of vinyl chloride and mixtures of $C_1$ chlorinated compounds and $C_2$ chlorinated compounds containing vinyl chloride wherein the total number of hydrogen atoms in the mixture is at least equal to the total number of chlorine atoms.

4. The process of claim 3 wherein the chlorinated organic compound is vinyl chloride.

5. The process of claim 4 wherein the ruthenium is supported on a non-oxidizing carrier and contains 0.01 to 1.0 weight percent ruthenium.

6. The process of claim 5 wherein the non-oxidizing carrier is aluminum oxide.

7. The process of claim 6 wherein the temperature in step (a) is above 320° C. and the temperature in step (b) is in the range of about 350° C. to about 600° C.

8. The process of claim 7 wherein the temperature of step (a) is above 340° C. and the temperature of step (b) is in the range of about 400° C. to about 500° C.

9. A method for substantially reducing the amount of chlorinated organic compounds in a gaseous stream containing chlorinated organic compounds by decomposing said chlorinated organic compounds, said chlorinated organic compounds containing 1 to 4 carbon atoms and containing at least as many hydrogen atoms as chlorine atoms, said method comprising:
   a. heating a gaseous stream comprising said chlorinated organic compounds and an oxidizing gas selected from air and a mixture of nitrogen and oxygen to a temperature above about 300° C., and
   b. then passing the heated gaseous stream of step (a) through a heated zone having a temperature of at least about 350° C. wherein it contacts a catalytic amount of ruthenium.

10. The process of claim 9 wherein the chlorinated organic compounds are selected from the group consisting of vinyl chloride and mixtures of $C_1$ chlorinated compounds and $C_2$ chlorinated compounds containing vinyl chloride wherein the total number of hydrogen atoms in the mixture is at least equal to the total number of chlorine atoms.

11. The process of claim 10 wherein the chlorinated organic compound is vinyl chloride.

12. The process of claim 11 wherein the ruthenium is supported on a non-oxidizing carrier and contains 0.01 to 1.0 weight percent ruthenium.

13. The process of claim 12 wherein the non-oxidizing carrier is aluminum oxide.

14. The process of claim 13 wherein the temperature in step (a) is above 320° C. and the temperature in step (b) is in the range of about 350° C. to about 600° C.

15. The process of claim 14 wherein the temperature in step (a) is above 340° C. and the temperature in step (b) is in the range of about 400° C. to about 500° C.

16. The process of claim 5 wherein the ruthenium is impregnated on the support carrier.

17. The process of claim 5 wherein the ruthenium is coated on the support carrier.

* * * * *